United States Patent [19]

Roccaforte

[11] Patent Number: 4,485,581
[45] Date of Patent: Dec. 4, 1984

[54] INSECT CAPTURING DEVICE AND BLANK THEREFOR

[75] Inventor: Harry I. Roccaforte, Western Springs, Ill.

[73] Assignee: Champion International Corporation, Stamford, Conn.

[21] Appl. No.: 446,206

[22] Filed: Dec. 3, 1982

[51] Int. Cl.³ .............................................. A01M 1/10
[52] U.S. Cl. ......................................... 43/121; 43/114
[58] Field of Search ................. 43/121, 107, 114, 131, 43/132

[56] References Cited

U.S. PATENT DOCUMENTS

| | | | |
|---|---|---|---|
| 1,314,242 | 8/1919 | Bjorge | 43/121 |
| 1,715,173 | 5/1929 | Opitz | 43/131 |
| 1,857,890 | 5/1932 | Sullivan | 43/107 |
| 2,359,341 | 10/1944 | Weil | 43/131 |
| 3,304,646 | 2/1967 | Staley | 43/114 |
| 3,343,744 | 9/1967 | Morell et al. | 43/131 |
| 3,352,053 | 11/1967 | Anderson | 43/131 |
| 3,802,116 | 4/1974 | Meguro et al. | 43/121 |
| 3,911,612 | 10/1975 | Sorenson et al. | 43/107 |
| 3,913,259 | 10/1975 | Nishimura et al. | 43/114 |
| 4,044,495 | 8/1977 | Nishimura et al. | 43/121 |
| 4,214,400 | 7/1980 | Patmore et al. | 43/121 |
| 4,228,613 | 10/1980 | Kalnasy et al. | 43/131 |
| 4,395,842 | 8/1983 | Margulies | 43/121 |

Primary Examiner—Nicholas P. Godici
Assistant Examiner—Kurt Rowan
Attorney, Agent, or Firm—Evelyn M. Sommer

[57] ABSTRACT

An insect capturing device of substantially hollow construction comprises a generally rectangular bottom panel, a generally rectangular top panel, four side panels extending between the top and bottom panels, four generally triangular entrance ways formed at the intersections of adjacent side panels and the bottom panel, and four internal baffles each of which is disposed within the device and each of which partially obstructs an associated one of the entrance ways.

11 Claims, 4 Drawing Figures

INSECT CAPTURING DEVICE AND BLANK THEREFOR

BACKGROUND OF THE INVENTION

The present invention is directed to the field of insect capturing devices and more particularly to boxes for trapping insects such as cockroaches, and the like.

A number of various devices for trapping and/or killing insects are available to the consumer. For example, insecticides are widely available in spray can or bottle form. However, insecticides are generally toxic to animals as well as insects, and are thus undesirable, especially where children and/or animals are present.

Other means for capturing and killing insects typically includes adhesive substances to which the insects adhere and subsequently die. Such techniques avoid the shortcomings of insecticides in so far as they do not require toxic substances. However, it has been found that insects such as cockroaches, having a highly developed tactile sense, are many times able to avoid the adhesive type trap.

Other devices, such as boxes having adhesive substances therein exploit the insects' propensity for crawling into holes, cracks and shaded areas. One such device which greatly facilitates the entry of insects therein is disclosed in U.S. Pat. No. 4,214,400 to Patmore et al., assigned to the assignee of the present invention.

OBJECTS AND SUMMARY OF THE INVENTION

It is an object of the invention to provide and insect capturing device of new and useful design.

It is a further object of the invention to provide an insect capturing device which is readily and economically constructed.

It is a further object of the invention to provide an insect capturing device which greatly facilitates the entry of insects therein.

The insect capturing device of the present invention is of substantially hollow construction and comprises a generally rectangular bottom panel, a generally rectangular top panel of a size generally the same as the size of the bottom panel, and four side panels extending between the top panel and the bottom panel. Four generally triangular entrance ways are formed at the intersections of adjacent side panels and the bottom panel. Four internal baffles are each disposed inside the device, and each partially obstructs an associated one of the entrance ways.

Each of the entrance ways extends substantially from the bottom panel substantially to the top panel, and each of the internal baffles is inclined substantially from the bottom panel substantially to the top panel at its associated entrance way. Preferably, each of the baffles is generally rectangular in shape, and the bottom and top panels are generally square in shape.

The present invention is also embodied in a blank for forming an insect capturing device, the blank comprising a generally rectangular top panel, a plurality of outer side panels, a generally rectangular bottom panel, the corners of which are removed, a plurality of inner side panels, a common side panel, and a baffle panel. The plurality of outer side panels are hingedly connected to the top panel at the sides thereof, and the plurality of inner side panels are hingedly connected to the bottom panel at the sides thereof. The common side panel is hingedly connected (i) at one end to the top panel and (ii) at the other end to the bottom panel. The baffle panel is hingedly connected to one of the inner side panels. The baffle panel includes a plurality of baffles hingedly connected thereto. The outer side panels, common side panel, the bottom panel and inner side panels are configured such that four generally triangular entrance ways are formed at the intersections of adjacent outer side panels and the bottom panel when the insect capturing device is constructed. The baffles are configured such that each of the baffles partially obstructs an associated one of the entrance ways.

Preferably, a baffle tab is hingedly connected (i) at one end to one of the inner side panels, and (ii) at the other end to the baffle panel. The baffle panel is generally rectangular in shape and has a baffle at each corner thereof. The baffle panel is smaller in size than the bottom panel, and each of the baffles extends beyond the baffle panel. The top panel, bottom panel and baffle panel are preferably square in shape.

BRIEF DESCRIPTION OF THE DRAWINGS

These and other objects, aspects and embodiments of the invention will be described with reference to the following drawing figures of which.

DETAILED DESCRIPTION OF THE INVENTION

Figure 1:
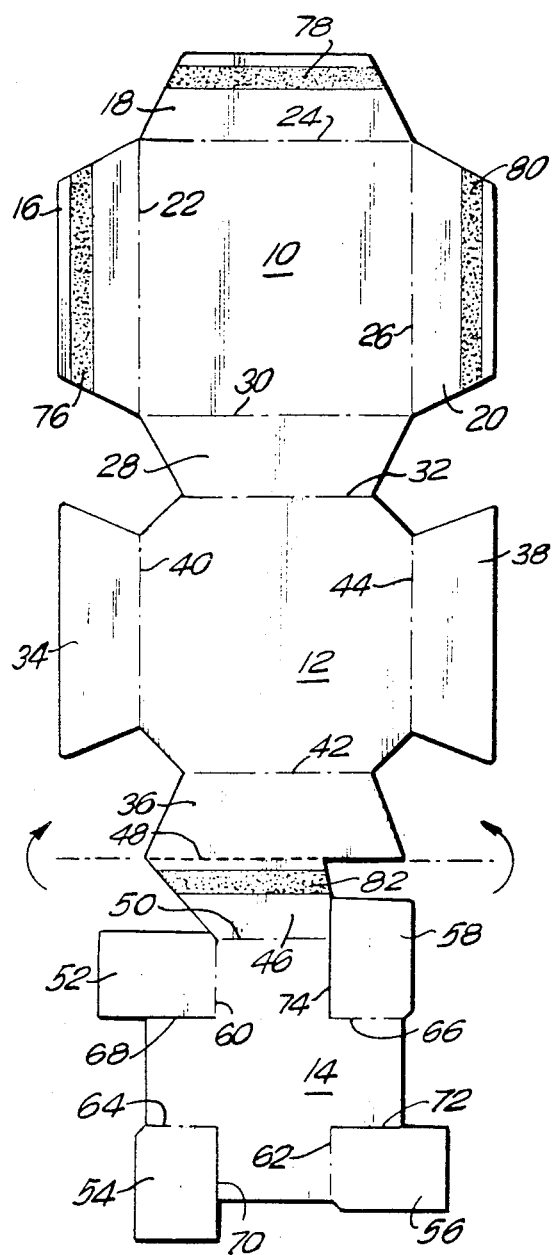
FIG. 1 is a plan view of the blank for producing the insect capturing device in accordance with the present invention.

With reference to FIG. 1, the blank from which the insect capturing device is constructed is comprised of a top panel 10, bottom panel 12, and a baffle panel 14 formed on a single sheet of paperboard or other similar material. The top panel 10 is generally rectangular, preferably square, and provided with a plurality of outer side panels 16, 18 and 20 hingedly connected to the top three sides of top panel 10 by means of respective score lines 22, 24 and 26. The sides of each of the outer side panels extend from the panel 10 inwardly toward each other, the outer side panels 16-20 thus forming trapezoids, as shown. The bottom side of the top panel 10 is hingedly connected to a common side panel 28 by means of score line 30, the configuration of the common side panel 28 being substantially identical to the configuration of the outer side panels 16-20.

The bottom panel 12 is generally rectangular, preferably square in shape, and substantially the same size as the top panel 10, with the four corners of the panel 12 removed at 45° angles as shown. The side of the bottom panel 12 closest to the top panel 10 is hingedly connected to the common side panel 28 by means of a score line 32. The remaining three sides of the square forming the bottom panel 12 are provided with respective inner side panels 34, 36 and 38, each of which is hingedly connected to a respective side of the bottom panel by means of respective score lines 40, 42 and 44. The sides of the inner side panels extend from the bottom panel 12 outwardly away from each other, the inner side panels 34-38 thus forming trapezoids.

The baffle panel 14 is hingedly connected to the inner side panel 36 by means of a baffle tab 46. Specifically, the baffle tab 46 is connected to the inner side panel 36 by means of perforations 48, while the baffle tab 46 is connected to the baffle panel 14 by means of a score line 50. The baffle panel 14 is generally rectangular, preferably square in shape, and is slightly smaller than bottom panel 12 in size. At the four corners of the baffle panel 14 are an associated four baffles 52, 54, 56 and 58, each hingedly connected to the baffle panel by means of perforations. In particular, the diagonally opposed upper left and lower right baffles 52 and 56 are connected to the baffle panel 14 by means of respective perforations 60 and 62 which are parallel to the left and right sides of the baffle panel 14, while diagonally opposed lower left and upper right baffles 54 and 58 are connected to the baffle panel 14 by means of respective score lines 64 and 66 which run parallel to the bottom side of the baffle panel 14. Each of the baffles 52–58 is separated from the baffle panel 14 by respective cut lines 68, 70, 72 and 74, to thus allow the baffles to move freely about the perforations 60–66 relative to the baffle panel 14. The baffles extend beyond the boundary of the panel 14 in the directions of their associated cut lines 68–74.

Finally, strips of adhesive material 76, 78 and 80 are provided on outer side panels 16, 18 and 20 and are disposed parallel to the respective score lines 22, 24 and 26. Similarly, a strip of adhesive material 82 is provided on the baffle tab 46 and is disposed generally parallel to perforations 48.

The technique for constructing the insect capturing device from the blank illustrated in FIG. 1 will now be discussed with further reference to FIGS. 2–4. First, the baffle panel 14 is moved upwardly and onto the bottom panel 12 by folding the blank along the perforations 48 as shown by the arrows in FIG. 1, to thus produce the structure illustrated in FIG. 2. The adhesive strip 82 functions to adhesively secure the baffle tab 46 to the inner side panel 36.

Figure 2:
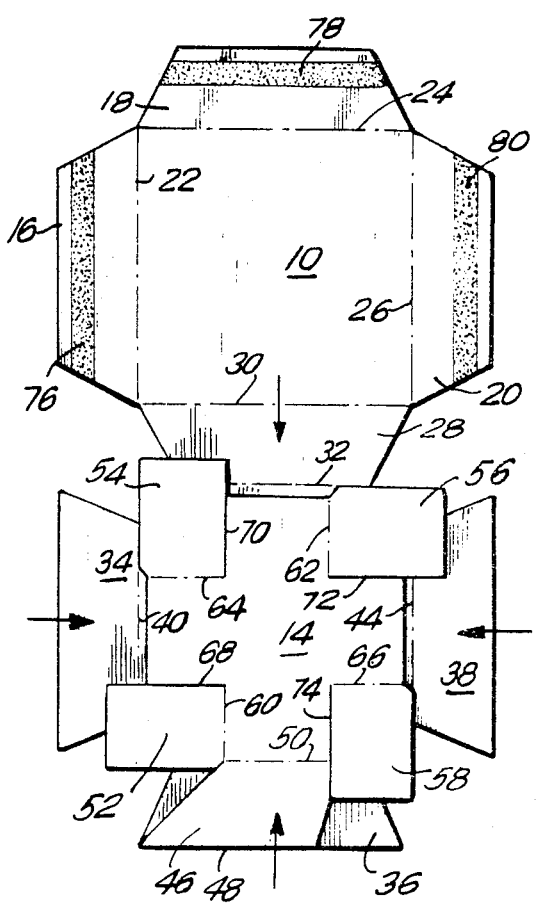
FIG. 2 is a plan view of the blank of FIG. 1 in partially constructed form.
Figure 3:
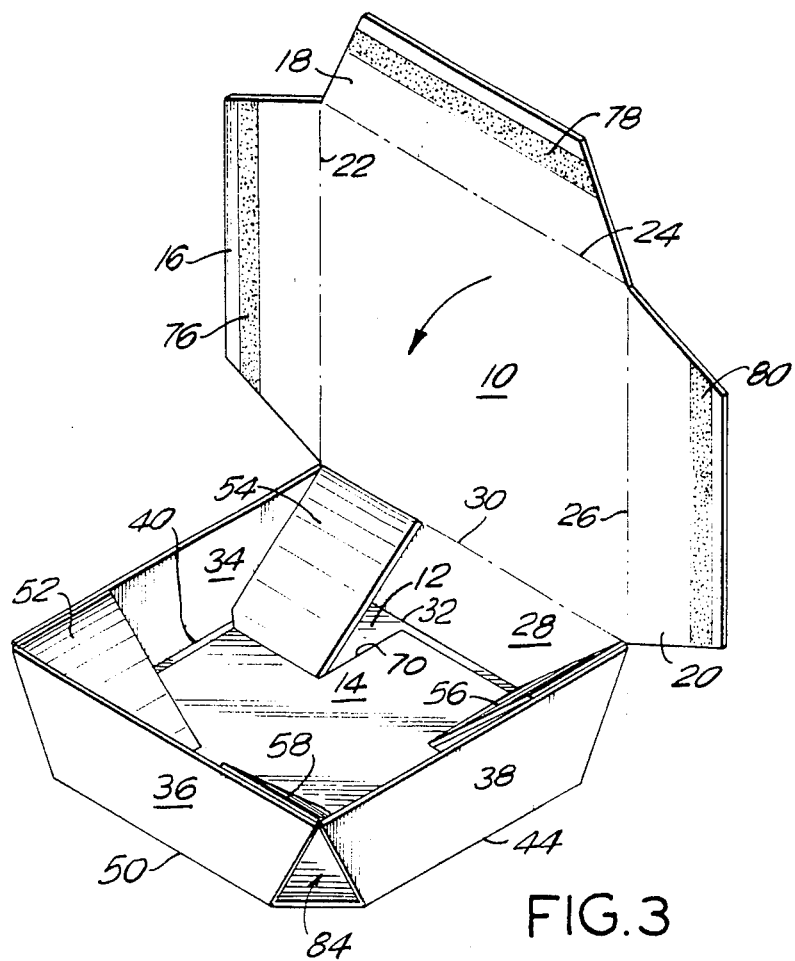
FIG. 3 is a perspective view of the insect capturing device in partially constructed form.

The inner side panels 34, 36 and 38, along with the common side panel 28 are folded upwardly along the respective score lines 40, 42, 44, and 32 as shown by the arrows in FIG. 2 to produce the structure shown in perspective in FIG. 3. Since the baffles 52–58 extend beyond the border of the baffle panel 14, they interfere with the inner side panels 34–38 and common side panel 28 when the panels are folded upwardly. The baffles thus move upwardly along the sides of the panels 34–38 and 28 to the inclined positions illustrated in FIG. 3. The baffles 52–58 are sized relative to the panels 34–38 and 28 such that they do not extend above or beyond the boundary formed by the tops of the panels, as also shown in FIG. 3. By configuring the panels 34–38 and 28, and the bottom panel 12 as described above, four triangular entrance ways 84 are formed, each of the entrance ways being partially covered with an associated baffle.

Figure 4:
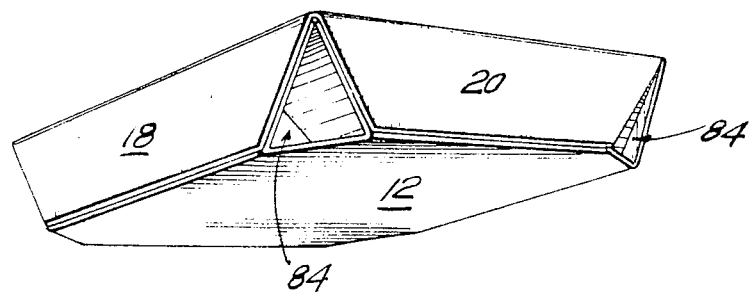
FIG. 4 is a perspective view of the insect capturing device in fully constructed form.

The insect capturing device is completed by folding the top panel 10 down along score line 30, as shown by the arrow in FIG. 3, and then adhesively securing each of the outer side panels 16, 18 and 20 to the inner side panels 34, 36 and 38, respectively, to produce the completed structure illustrated in FIG. 4. By configuring the outer side panels 16–20 as described, the four entrance ways remain in the completed structure.

It is envisioned that an adhesive substance along with an insect attractant (neither shown) be placed on the baffle panel 14 in order to lure and capture the insects. The insects will not only enter the device but will proceed into the device beyond the baffles 52–58, thus making any escape extremely difficult upon encountering the adhesive. It should be noted that the adhesive and insect attractant employed for capturing the insects does not represent a part of the present invention.

Those skilled in the art will appreciate that the insect capturing device in accordance with the present invention is of economical design and readily constructed. Additionally, the triangular entrance ways 84 and baffles 52–58 make it exceedingly difficult for an insect to escape after entry.

Although the present invention has been described with reference to the foregoing specification and drawings, many modifications, additions and deletions thereto may be made within the spirit and scope of the invention. The scope of the invention will now be described with reference to the following claims.

What is claimed is:

1. A blank for forming an insect capturing device comprising:
    a generally rectangular top panel;
    a plurality of outer side panels hingedly connected to the top panel at the sides thereof;
    a generally rectangular bottom panel, the corners of the bottom panel being removed;
    a plurality of inner side panels hingedly connected to the bottom panel at the sides thereof;
    a common side panel hingedly connected (i) at one end to the top panel and (ii) at the other end to the bottom panel; and
    a baffle panel hingedly connected to one of the inner side panels, the baffle panel having a plurality of baffles hingedly connected thereto;
    wherein the outer side panels, the common side panel, the bottom panel, and the inner side panels are configured such that four generally triangular entrance ways are formed at the intersections of adjacent outer side panels and the bottom panel when the blank of the insect capturing device is erected.

2. The blank of claim 1 wherein the baffles are configured such that each of the baffles partially obstructs an associated one of the entrance ways.

3. The blank of claim 2 further comprising a baffle tab hingedly connected (i) at one end to one of the inner side panels, and (ii) at the other end to the baffle panel.

4. The blank of claim 2 wherein the baffle panel is generally rectangular in shape and has a baffle at each corner thereof.

5. The blank of claim 4 wherein the baffle panel is smaller in size than the bottom panel, and each of the baffles extends beyond the baffle panel.

6. The blank of claim 5 wherein the top panel, the bottom panel and the baffle panel are generally square.

7. A paperboard carton formed from a single folded blank of paperboard material for trapping insects, comprising:
    opposed top and bottom substantially rectangular walls disposed in spaced parallel relationship;
    opposed pairs of parallel side walls foldably connected to and extending between said top and bottom walls, said side walls being configured to form entrance ways, between adjacent ones of said side walls said entrance ways extending into said carton; and
    generally planar internal baffles disposed respectively adjacent each said entrance way and the two side walls forming the respective entrance way, each said baffle being foldably connected to said bottom wall along a fold line disposed intermediate and generally parallel to the side walls in one said pair of parallel side walls and being inclined with respect to said top and bottom walls, each said baffle including an edge extending generally parallel to the fold line of said baffle to said bottom wall, said edge being disposed adjacent the foldable connection between said top wall and one said side wall whereby each said baffle at least partly obstructs the associated entrance way and guides the insects into the central part of the paperboard carton.

8. A carton as in claim 7 wherein said top panel is generally rectangular and wherein said carton includes four side panels extending between and connected to said top and bottom panels and four entrance ways formed between adjacent ones of said side panels.

9. A carton as in claim 7 further including a baffle panel disposed on the interior of the carton and in face-to-face contact with said bottom panel, said baffles being hingedly connected to said baffle panel.

10. A carton as in claim 7 wherein said entrance ways are generally triangular.

11. A carton as in claim 9 formed from a single blank of paperboard material.

* * * * *